United States Patent
Suzuki et al.

(10) Patent No.: US 6,860,119 B2
(45) Date of Patent: Mar. 1, 2005

(54) OPTICAL FIBER SPLICING METHOD

(75) Inventors: Tetsuo Suzuki, Tokyo (JP); Naoki Amatatsu, Tokyo (JP); Hiroaki Oonuma, Tokyo (JP); Wataru Komatsu, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 434 days.

(21) Appl. No.: 10/171,016

(22) Filed: Jun. 11, 2002

(65) Prior Publication Data

US 2002/0197028 A1 Dec. 26, 2002

(30) Foreign Application Priority Data

Jun. 12, 2001 (JP) .................................. 2001-177280
Apr. 24, 2002 (JP) .................................. 2002-122680

(51) Int. Cl.[7] .................... G02B 6/255; C03B 37/027
(52) U.S. Cl. ..................................... 65/407; 65/377
(58) Field of Search .......................... 65/377, 385, 407; 385/95–96

(56) References Cited

U.S. PATENT DOCUMENTS

| | | | | |
|---|---|---|---|---|
| 4,557,556 A | * | 12/1985 | Decker, Jr. ................. | 385/140 |
| 4,884,859 A | * | 12/1989 | Yamamoto et al. ......... | 385/140 |
| 4,948,412 A | * | 8/1990 | Yamada et al. ............. | 65/377 |
| 6,502,427 B1 | * | 1/2003 | Yuan .......................... | 65/377 |
| 2004/0091219 A1 | * | 5/2004 | Christensen et al. ........ | 385/96 |

FOREIGN PATENT DOCUMENTS

| | | | | |
|---|---|---|---|---|
| EP | 0 340 042 A1 | 11/1989 | | |
| EP | 0 890 853 A1 | 1/1999 | | |
| EP | 1 094 346 A1 | 4/2001 | | |
| JP | 01-284805 | * | 11/1989 | ............ G02B/6/24 |
| JP | 02 084604 | | 3/1990 | |
| JP | 03 238404 | | 10/1991 | |
| JP | 04-134406 | * | 5/1992 | ............ G02B/6/28 |
| JP | 04 360108 | | 12/1992 | |
| JP | 07 084142 | | 3/1995 | |
| JP | 07-248426 | * | 9/1995 | ............ G02B/6/38 |
| JP | 08-179153 | * | 7/1996 | ............ G02B/6/28 |
| JP | 11-119053 | * | 4/1999 | ............ G02B/6/28 |
| WO | WO 00/19256 | | 4/2000 | |

OTHER PUBLICATIONS

Patent Abstract of Japan for Publication No. 02–115807, Apr. 27, 1990.*
Patent Abstract of Japan for Publication No. 02–219005, Aug. 31, 1990.*
Patent Abstract of Japan for Publication No. JP401044406, Feb. 16, 1989.*

* cited by examiner

Primary Examiner—Peter Chin
Assistant Examiner—Carlos Lopez
(74) Attorney, Agent, or Firm—Knobbe, Martens, Olson & Bear, LLP

(57) ABSTRACT

An optical fiber splicing method is provided for largely reducing an optical loss in a splice and eliminating a varying outer diameter and bending deformation. This splicing method splices opposing end faces of two optical fibers by fusion, and heats a formed fusion splice to match mode field diameters of the two optical fibers in the fusion splice, wherein the two optical fibers are fixed with an axial tension applied or not applied to the fusion splice, after the formation of the fusion splice, before the fusion splice is heated.

5 Claims, 2 Drawing Sheets

OPTICAL FIBER SPLICING METHOD

BACKGROUND

1. Field of the Invention

The present invention relates to an optical fiber splicing method, and more particularly, to an optical fiber splicing method for splicing opposing end faces of two optical fibers which are different in mode field diameter (MFD) from each other or two optical fibers which have small MFDs with a small loss.

2. Prior Art

In recent years, the transmission capacity has been dramatically increased thanks to the development of wavelength division multiplexing (WDM) transmission scheme in optical communication systems. Optical fiber lines routed in such a system which has a large transmission capacity are required to provide performances such as a reduced nonlinear optical effect, a reduced wavelength dispersion, a smaller wavelength dispersion slope, and the like.

To meet the requirements, the following dispersion management line is now under investigation. The dispersion management line has, for example, a simple mode fiber (SMF, for example, 1300 nm zero dispersion optical fiber), and a dispersion compensating optical fiber for compensating the dispersion and the dispersion slope of the SMF (for example, dispersion compensating fiber: DCF, dispersion slope compensating fiber: SDCF, reverse dispersion fiber: RDF, and the like), which are spliced end-to-end by fusion, and is intended for use in high speed communications using, for example, light in a 1550 nm band.

The 1300 nm zero dispersion optical fiber, which is the simple mode optical fiber illustrated above, has a core made of silica doped with $GeO_2$ and a clad made of pure silica, and exhibits MFD in a range of 9 to 11 $\mu$m at wavelength of 1550 nm. An MFD enhanced simple mode optical fiber in turn exhibits MFD equal to or more than 11 $\mu$m.

On the other hand, with a dispersion compensating optical fiber having a negative high dispersion characteristic, the relative index difference must be as high as approximately 3%. For this reason, the core is formed of silica heavily doped, for example, with $GeO_2$, and the clad is formed of silica doped with fluorine. The core has a diameter of approximately 2 to 3 $\mu$m, which is extremely small as compared with the core diameter of a simple mode fiber. The MFD at wavelength of 1550 nm is approximately 5 $\mu$m. In other words, the dispersion compensating fiber is smaller in both core diameter and MFD than the simple mode fiber at wavelength of 1550 nm.

Therefore, simple fusion splicing of end faces of the two optical fibers would give rise to an optical loss due to light leak based on the difference in MFD at the splice, even if the optical axes of both fibers are in alignment with each other. For example, when a simple mode optical fiber having MFD of 10 $\mu$m is spliced to a dispersion compensating optical fiber having MFD of 5 $\mu$m by fusion with their optical axes placed in alignment, an optical loss at the fusion splice is on the order of 1.94 dB.

Generally, for addressing the generation of the optical loss in the fusion splice, a TEC method (Thermally Defused Expanded Core method) is applied to reduce the optical loss.

The TEC method applies a heating treatment to the fusion splice to diffuse dopants in the core into the clad to substantially increase the diameter of the core and MFD.

For example, when the TEC method is applied to a fusion splice of a simple mode optical fiber and a dispersion compensating optical fiber, the softening temperature of the clad (doped with fluorine) in the dispersion compensating fiber lower than the softening temperature of the clad (pure silica) in the simple mode fiber causes the dopant ($GeO_2$) in the cores of both optical fibers to diffuse into the associated clads faster in the dispersion compensating fiber than in the simple mode fiber. Therefore, in the process of heating treatment, the dopant in the core of the dispersion compensating optical fiber diffuses more to advance substantial enlargement of the core diameter in the fusion splice, causing the core diameter of the dispersion compensating fiber to match with the core diameter of the simple mode optical fiber. In other words, the MFDs match to reduce an optical loss between both optical fibers.

The optical loss is reduced in the fusion splice in this way.

The splicing of optical fibers involves not only splicing of different types of optical fibers which are different in core diameter and MFD from each other, but also splicing of the same type of optical fibers for adjusting the length of an overall optical line and adjusting the characteristics.

For example, splicing may be performed with dispersion compensating optical fibers of the same type having an extremely small MFD and accordingly an extremely small core diameter. In this event, opposing end faces of the two optical fibers are likewise spliced by fusion using, for example, a fusion splicer.

In this case, however, the extremely small core diameter gives rise to a problem that even a slight misalignment of the cores would cause a large optical loss at the fusion splice. In addition, if a discharge fusion splicer, for example, is used for the fusion splicing, a sufficient reduction in optical loss has not been provided during splicing of recent fine cores even if a discharge condition is optimized for the discharge fusion splicer.

For this reason, the TEC method is applied to the formed fusion splice, even in such a splice, to diffuse dopants in the cores to enlarge MFDs in the fusion splice to prevent the optical loss due to the misalignment.

When the aforementioned dispersion management line is used, for example, in an optical submarine cable or the like, the fusion splice is required to have a high strength as well as provide a small loss.

In regard to an increase in the strength of the fusion splice, the following action has been conventionally taken. Specifically, before fusion splicing, the surface of an optical fiber is covered with a resin protection layer for reducing or removing the influence of factors which deteriorate the strength of the optical fiber, such as a contact of the optical fiber with a fiber cutter, a V-groove of a fusion splicer in which the optical fiber is placed, a fiber clamp for fixing the optical fiber, and the like.

However, the formation of the resin protection layer causes not a few tackiness to remain on the surface. This may result in a loss of progressivity of the optical fiber which would serpentine, or prevent the two optical fibers from progressing at a timing at which they should progress at the fusion splice. As a result, the amount of shift of the core is larger as compared with an optical fiber formed with no resin protection layer, leading to an increased optical loss in the fusion splice.

Particularly, when an optical fiber having a small MFD is formed with the resin protection layer for fusion splicing with a high strength, even a slight misalignment of the core should be avoided for reducing an optical loss. Actually, however, this is a quite difficult operation.

As appreciated from the foregoing, though the formation of the resin protection layer on the surface of an optical fiber to be spliced may be effective means for increasing the strength of a fusion splice, on the other hand, this introduces a further increase in optical loss in the fusion splice as compared with an optical fiber formed with no resin protection layer.

The heating treatment performed after the fusion splicing generally involves discharge, hydrogen/oxygen burner flame, and propane/oxygen burner flame.

However, the discharge heating merely locally heats the fusion splice at high heating temperatures. The fusion splice is treated in a relatively short time and suddenly cooled down. This gives rise to a problem that the dopant in the core is likely to diffuse with instability, and distortion is accumulated in glass of the fusion splice.

Moreover, the discharge heating encounters difficulties in optimizing the discharge condition, properly controlling a heating temperature, and properly locating a site to be heated. For this reason, when the discharge heating is repeated a plurality of times, the fusion splice suffers from a varying outer diameter (so-called constriction), resulting in a reduced diameter and simultaneous degradation of strength.

On the other hand, with burner flame based heating, a proper temperature control is facilitated as compared with the discharge heating, and a site to be heated is appropriately narrowed down with ease. On the other hand, however, an optical fiber remains recumbent, and a burner flame is applied to a softened fusion splice, so that the pressure of the flame and the self weight of the optical fiber cause a bending deformation in the fusion splice, possibly increasing an optical loss.

Such a problem is addressed by heating the fusion splice while it is applied with a tension in the axial direction. However, depending on the magnitude of a tension to be applied, the softened fusion splice will draw, and as is the case with the repeated discharge heating, the fusion splice will be formed with a reck to introduce a reduced strength of the fusion splice and large variations in strength.

An optical fiber in such a state can give rise to a break when the fusion splice is bent, due to a stress concentrating thereon.

OBJECT AND SUMMARY OF THE INVENTION

Figure 1:
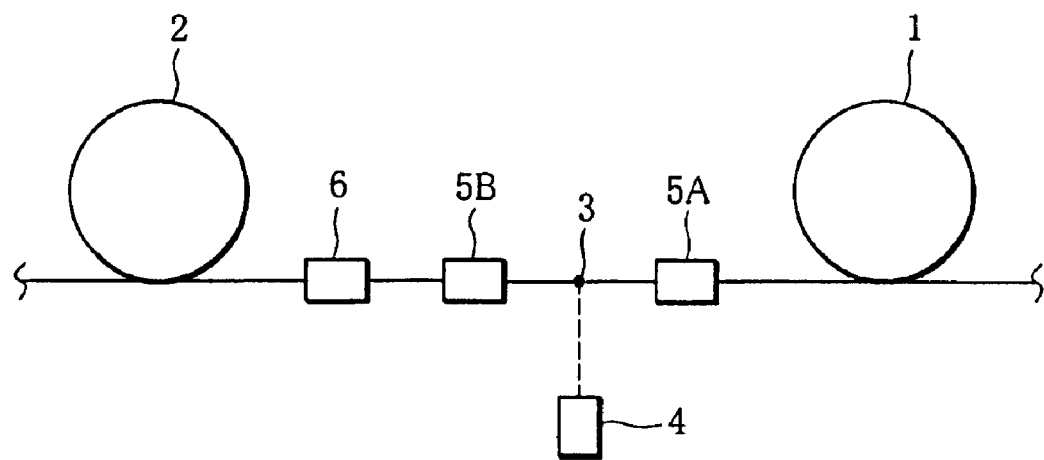
FIG. 1 is a schematic diagram showing an example of splicing method according to the present invention.

It is an object of the present invention to provide an optical fiber splicing method which is capable of reducing an optical loss in a fusion splice and simultaneously increasing the strength of the fusion splice and minimizing variations in strength during splicing of optical fibers, and is suitable for application in optical fibers of different types having different MFDs and optical fibers of the same type having extremely small MFDs.

To achieve the above-mentioned object, the present invention provides an optical fiber splicing method which includes splicing opposing end faces of two optical fibers by fusion to form a fusion splice, and heating the fusion splice to match mode field diameters of the two optical fibers positioned at the fusion splice, characterized by fixing the two optical fibers to fixing tools with an axial tension applied or not applied to the fusion splice prior to the heating treatment after the fusion splice has been formed, and thereafter performing the heat treatment.

In this event, the applied tension is preferably equal to or less than 1176 mN, and more preferably in a range of 0.98 to 49 mN.

DETAILED DESCRIPTION

First, in the present invention, end faces of two optical fibers to be spliced are spliced by fusion to form a fusion splice. The fusion splicing may be performed using, for example, a discharge fusion splicer, as before. At this time, the two optical fibers do not match in MFD in most cases in the fusion splice.

Next, the fusion splice undergoes a heating treatment, later described, to match MFDs of the two optical fibers. Procedures involved in the matching will be described below with reference to FIG. 1.

Procedure 1: First, a fusion splice 3 of an optical fiber 1 and an optical fiber 2 is placed at a position in heating means 4, and one optical fiber (optical fiber 1 in FIG. 1) is held and fixed, for example, by a fixing tool 5A such as a clamp.

In this event, a holding force applied to the optical fiber 1 by the fixing tool 5A is set at a value larger than an applied tension, later described.

Procedure 2: Next, the optical fiber 2 is held by a fixing tool 5B placed near the optical fiber 2. The optical fiber 2 is loosely held in such a manner that the optical fiber 2 can be movable through the fixing tool 5B, rather than tightly held as is the case with the optical fiber 1.

Procedure 3: Next, a tension meter 6 placed outside the fixing tool 5B is set to the optical fiber 2 to apply the optical fiber 2 with a predetermined tension, and the optical fiber 2 is fixed in this state.

Therefore, the fusion splice 3 is fixed between the fixing tool 5A and the tension meter 6 while continuously stretched with the tension applied from the tension meter 6. In this event, since a holding force of the fixing tool 5A is larger than the applied tension, the optical fiber 1 will not come off the fixing tool 5A.

Alternatively, in Procedure 3, the optical fiber 2 may be simply fixed by the fixing tool 5A or the tension meter 6 and fixing tool 5B without applying the optical fiber 2 with a tension.

Procedure 4: Finally, the heating means 4 is operated to heat the fusion splice 3 to match the two optical fibers in MFD.

The heating means 4 used in this procedure is preferably a burner flame. This is because, as described above, a heating temperature is readily controlled, and only a target site can be selectively heated with relatively high exactitude.

With this heating treatment, the smaller one of the MFDs of the optical fiber 1 and optical fiber 2 gradually diverges in the fusion splice 3 to match with the larger MFD. As a result, an optical loss is reduced.

In this event, assuming that the heating temperature is constant, the dopant diffuses more as a heating time is longer thereby to enlarge the diameter of the smaller MFD, and correspondingly, the optical loss is reduced in the fusion splice. Consequently, the optical loss is minimized at the time the two MFDs completely match.

For monitoring this state, the splicing operation is preferably performed under the following system in the present invention.

Figure 2:
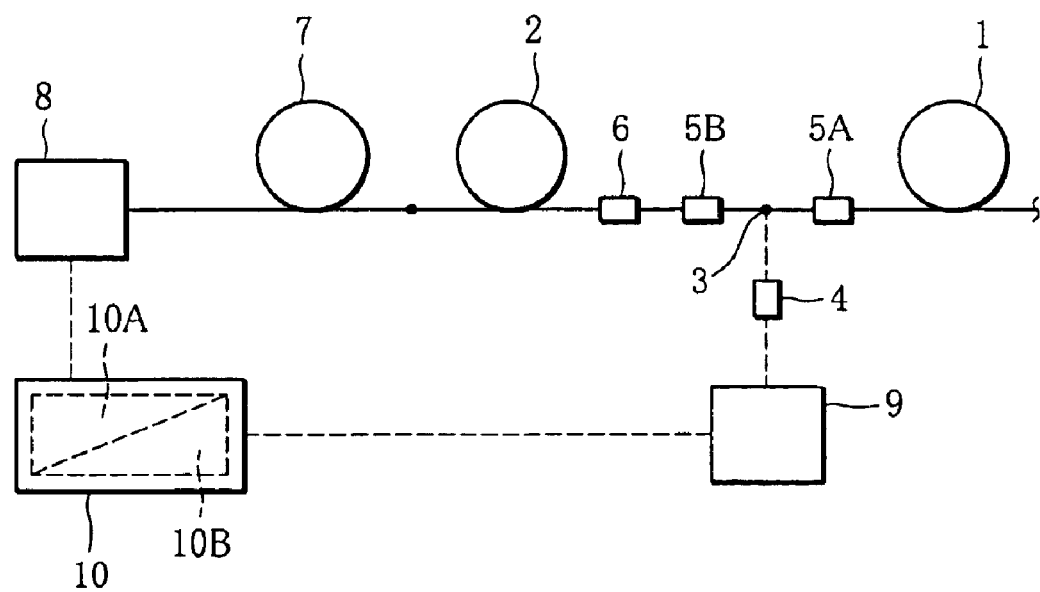
FIG. 2 is a schematic diagram showing an example of system for monitoring a splicing state in the splicing method of the present invention.

As shown in FIG. 2, an OTDR 8 is connected to the other end of the optical fiber 2 in FIG. 1, for example, through a dummy fiber 7 spliced by fusion. Also, the heating means (for example, a burner) 4 is connected to a heating means control unit 9 for turning the heating means 4 on and off, and controlling the temperature, time, and the like.

Then, the OTDR 8 and the heating means control unit 9 are respectively connected to a feedback control unit 10 which comprises a signal comparator 10A, and a memory unit 10B for storing a set value for a target optical loss.

In the system of FIG. 2, testing light from OTDR 8 enters the dummy fiber 7 and the optical fiber 2, and enters the optical fiber 1 from the optical fiber 2 through the fusion splice 3, and return light of the optical fiber 1, the dummy fiber 7, optical fiber 2, and fusion splice 3 is fed back to the OTDR 8 in this order.

The OTDR 8 detects the return light and transduces it to electric signals, respectively. Then, the OTDR 8 monitors a light intensity, i.e., the degree of optical loss in the fusion splice 3 from one minute to the next, and inputs its monitor signal to the feedback control unit 10.

In the feedback control unit 10, the signal comparator 10A compares a target set value for the optical loss stored in the memory unit 10B with the monitor signal from the OTDR 8.

Then, the feedback control unit 10 transmits to the heating means control unit 9 an operation signal indicative of continued heating when the optical loss in the fusion splice displayed by the monitor signal is larger than the target set value, and transmits to the heating means control unit 9 a signal indicative of heating stop to terminate the heating operation by the heating means 4 when the optical loss is equal to or lower than the target set value.

This system can control a processing time to prevent excess and deficiency in the heating treatment time, to match the MFDs of the two optical fibers without fail, and to bring the optical loss in the fusion splice 3 to the target set value.

In the splicing method described above, the optical fibers inflate in the process of heating treatment and contract in the cooling process. In the present invention, however, during the entire process of heating treatment and cooling process, the optical fibers 1, 2 are fixed between the fixing tool 5A and the tension meter 6 (constant spacing) with a tension applied thereto, so that the optical fibers 1, 2 hold a straight state at all times. In other words, since the fusion splice 3 does not extend during the heating process, a reduction in diameter (constriction) will not arise due to a varying outer diameter of the fusion splice, and a degraded strength will not either arise in the fusion splice otherwise resulting from the reduction in diameter.

In Procedure 3, the tension applied to the fusion splice 3 is preferably equal to or less than 1176 mN. The applied tension larger than 1176 mN would suddenly increase the optical loss in the fusion splice after the heating treatment.

In Procedure 3, the optical loss can be reduced as well when the heat treatment is applied after the optical fibers 1, 2 are simply fixed by the fixing tool 5A and fixing tool 5B without applying a tension to the fusion splice 3. Generally, glass exhibits approximately 0.1% of elastic deformation during a heating treatment. Therefore, it is considered that the optical fibers 1, 2 contract, even though slightly, toward the respective fixing tools, to automatically apply a tension to the fusion splice 3.

Further, the tension applied in Procedure 3 is preferably set in a range of 0.98 to 49 mN taking into account the varying outer diameter (reduction in diameter) and degraded strength of the fusion splice 3. This is because when the applied tension is set within the foregoing range, the varying outer diameter and degraded strength can be suppressed with certainty while the optical loss in the fusion splice is reduced, for example, to 0.1 dB or less.

EXAMPLES

Example 1

The following splicing operation was performed in the manner shown in FIGS. 1 and 2.

An optical fiber (simple mode fiber) 1 having an outer diameter of 125 $\mu$m and MFD of 11.4 $\mu$m with a core doped with $GeO_2$, and an optical fiber (dispersion compensating fiber) 2 having an outer diameter of 125 $\mu$m and MFD of 5.7 $\mu$m with a core doped with $GeO_2$ were prepared.

These optical fibers were set in a discharge fusion splicer, and their opposing end faces were spliced by fusion to form a fusion splice 3 under the condition of an arc discharge voltage equal to 1 kV, a discharge current equal to 17.9 mA, a discharge time equal to 2.3 seconds, and an indentation equal to 1 $\mu$m.

An optical loss in the fusion splice was approximately 1.6 dB.

Then, the optical fiber 1 was held and fixed by the clamp 5A. A holding force in this event was set to approximately 1960 mN.

Next, the optical fiber 2 was loosely held with a holding force equal to or less than 9.8 mN, and fixed with a tension applied thereto by the tension meter 6. In this event, the applied tension was changed at intervals of 196 mN (20 gf).

Next, the burner 4 was operated to heat the fusion splice 3. When the optical loss reached a target set value, the burner 4 was again operated to stop heating.

Figure 3:
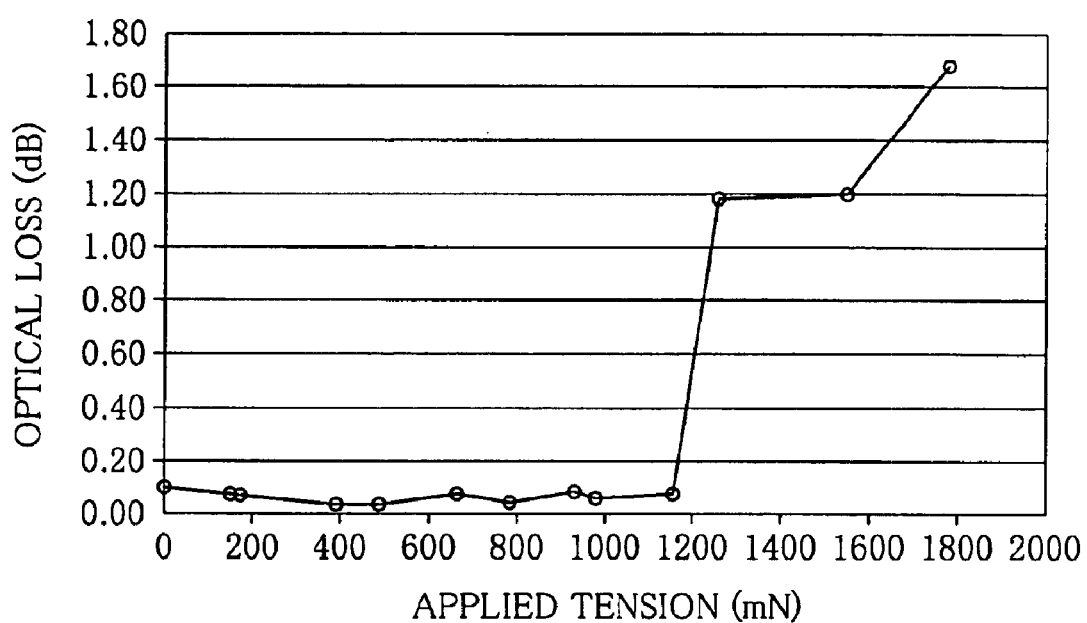
FIG. 3 is a graph showing the result of Example 1.

The optical loss in the fusion splice 3 after heating was measured, and the result is shown in FIG. 3 as a relationship between the optical loss and the applied tension.

As is apparent from FIG. 3, when the applied tension in Procedure 3 is increased to more than 1176 mN, the optical loss suddenly increases. Even when the optical fibers are simply fixed without applying a tension (applied tension equal to zero in FIG. 3), the optical loss is as small as approximately 0.1 dB.

Example 2

An MFD enlarged simple mode fiber 1 having an outer diameter of 125 $\mu$m and MFD of 12 $\mu$m with a core doped with $GeO_2$, and a dispersion compensating fiber 2 having an outer diameter of 125 $\mu$m and MFD of 4.9 $\mu$m with a core made of silica heavily doped with $GeO_2$ and a clad made of silica doped with fluorine were prepared.

Opposing end faces of the respective optical fibers were spliced by discharge fusion under similar conditions to Example 1 to form a fusion splice.

Next, the optical fibers 1, 2 were fixed after applying the fusion splice with a variety of tensions shown in Table 1 in a similar procedure to Example 1, and the fusion splice was heated by a burner for the respective cases.

Then, the system shown in FIG. 2 monitored an optical loss in the fusion splice using laser light at wavelength of 1500 nm, and the heating treatment was stopped at the time the optical loss was minimized.

Then, a laser outer diameter measuring device was used to measure the outer diameter of the fusion splice and a bending deformation amount. The following results are collectively shown in Table 1.

TABLE 1

|  | Tension applied to fusion splice before heating (mN) | Light loss in fusion splice monitored with 1550 nm laser light (dB) | Amount of variations in outer diameter (μm) | Amount of bending deformation (μm) |
| --- | --- | --- | --- | --- |
| Example 2 | 98 | 0.13 | 1 | 6 |
| Example 3 | 49 | 0.07 | 0.5 | 3 |
| Example 4 | 29.4 | 0.05 | 0.3 | 1 or less |
| Example 5 | 0.98 | 0.03 | 0.1 or less | 1 or less |
| Example 6 | 0 | 0.03 | 0.1 or less | 1 or less |

The followings are apparent from Table 1.

(1) Either of Examples 3, 4, 5 in which the tension applied before the heating treatment is in a range of 0.98 to 49 mN, show an optical loss less than 0.1 dB, and very small amounts of variations in outer diameter and bending deformation.

Example 2, in which the applied tension is 98 mN, presents a larger optical loss as well as larger amounts of variations in outer diameter and bending deformation, as compared with Examples 3 to 5.

It is appreciated from the foregoing that the tension set in a range of 0.98 to 49 mN, applied before the heating treatment, is highly preferable since this can largely reduce the optical loss in the fusion splice and simultaneously suppress the varying outer diameter (constriction) and bending deformation substantially with certainty.

(2) Table 1 shows a favorable result for Example 6 in which the optical fibers are simply fixed without a tension applied thereto, as is the case with Examples 3 to 5.

For confirmation, a reproductivity testing was conducted for these Examples. In Examples 3 to 5, the same results as those in Table 1 were obtained substantially with probability of 100%. However, in Example 6, the result of Table 1 was reproduced with probability of approximately 70%.

As is apparent from the foregoing description, the present invention can splice different types of optical fibers having different MFDs, and the same type of optical fibers having very small MFDs with a small loss. This is an effect produced by applying a tension to the fusion splice before the heating treatment, and then performing the heating treatment when the fusion splice is heated to match the optical fibers in MFD.

In this event, the applied tension is preferably equal to or less than 1176 mN. Further, the tension in a range of 0.98 to 49 mN can suppress a varying outer diameter (constriction) and bending deformation of the fusion splice, not mentioned to a large reduction in optical loss, and also effectively prevent the strength of the fusion splice from being degraded.

What is claimed is:

1. An optical fiber splicing method comprising the steps of:

splicing opposing end faces of two optical fibers by fusion to form a fusion splice;

heating said fusion splice to match mode field diameters of said two optical fibers positioned at said fusion splice; and fixing said two optical fibers to fixing tools with an axial tension applied or not applied to said fusion splice prior to said heating after said fusion splice has been formed.

2. The optical fiber splicing method according to claim 1, wherein:

said tension is set to 1176 mN or less.

3. The optical fiber splicing method according to claim 1 or 2, wherein:

said tension is set in a range of 0.98 to 49 mN.

4. The optical fiber splicing method according to claim 1, where:

heating means used in said heating is a burner means.

5. The optical fiber splicing method according to claim 1, further comprising the step of introducing light from one end of each said optical fiber, while said fusion splice is being heated, to monitor a change in light intensity when the introduced light passes through said fusion splice.

* * * * *

UNITED STATES PATENT AND TRADEMARK OFFICE
CERTIFICATE OF CORRECTION

PATENT NO. : 6,860,119 B2
DATED : March 1, 2005
INVENTOR(S) : Suzuki et al.

It is certified that error appears in the above-identified patent and that said Letters Patent is hereby corrected as shown below:

Column 8,
Line 33, delete "where:" and insert -- wherein: --.

Signed and Sealed this

Seventeenth Day of January, 2006

JON W. DUDAS
*Director of the United States Patent and Trademark Office*